United States Patent [19]

Fleming et al.

[11] Patent Number: 4,715,096

[45] Date of Patent: Dec. 29, 1987

[54] THERMALLY ACTUATED SEAT BELT FASTENER

[76] Inventors: Joseph A. Fleming, 4201 E. Pinal, Catalina, Ariz. 85635; Stephen J. Haider, 1463 W. Chapala Dr., Tucson, Ariz. 85705

[21] Appl. No.: 883,960

[22] Filed: Jul. 10, 1986

[51] Int. Cl.⁴ .............................................. A41F 1/00
[52] U.S. Cl. ...................................... 24/602; 24/603; 24/641
[58] Field of Search ................. 24/602, 603, 633, 641; 403/28, 32; 70/DIG. 10; 292/DIG. 66, 201; 280/801; 180/268

[56] References Cited

U.S. PATENT DOCUMENTS

| | | | |
|---|---|---|---|
| 2,824,315 | 2/1958 | McKenny | 24/603 X |
| 3,215,220 | 11/1965 | Schoeffler | 24/603 X |
| 3,430,305 | 3/1969 | Geffner | 24/603 |
| 3,779,004 | 12/1973 | Gloeckler | 59/93 |
| 3,963,090 | 6/1976 | Hollins | 24/603 X |
| 4,014,080 | 3/1977 | Caradec | 24/230 |
| 4,162,715 | 7/1979 | Coulombe | 24/602 X |
| 4,194,764 | 3/1980 | Grimm | 280/801 |
| 4,441,236 | 4/1984 | Bron | 24/602 X |
| 4,532,681 | 8/1985 | Baker et al. | 403/28 |

FOREIGN PATENT DOCUMENTS

| | | | |
|---|---|---|---|
| 2352897 | 4/1975 | Fed. Rep. of Germany | 24/602 |
| 2750335 | 5/1978 | Fed. Rep. of Germany | 24/602 |
| 2366847 | 10/1976 | France | 280/801 |
| 2390122 | 1/1979 | France | 24/602 |

Primary Examiner—Peter A. Aschenbrenner
Assistant Examiner—Laurie K. Cranmer
Attorney, Agent, or Firm—Cahill, Sutton & Thomas

[57] ABSTRACT

A thermally actuated seat belt fastener includes a conventional latching mechanism having an automotive thermostat type of actuator within a release button that is pressed by a user to release the fastener. If the thermostat is subjected to a predetermined high temperature, an internal plunger extends from the interior of the button to automatically release the fastener, without depressing of the release button.

5 Claims, 5 Drawing Figures

THERMALLY ACTUATED SEAT BELT FASTENER

BACKGROUND OF THE INVENTION

The invention relates to safety releases for seat belts, and more particularly to temperature-sensitive bimetal mechanisms for automatically releasing a seat belt fastener.

There are a substantial number of vehicular accidents which occur every year, wherein a vehicle catches fire, usually due to rupture of a fuel tank. In some instances, occupants of the vehicle are trapped inside the vehicle by their seat belts and burn to death because of their inability to release the seat belt fastener. In some instances, the inability of the injured person to release the seat belt fastener is due to injuries sustained by the individual, and other instances to the condition of the victim being in a state of shock or fright. Although consistent use of seat belts has been shown statistically to greatly reduce the number of and seriousness of injuries sustained by vehicle occupants involved in collisions, the fear of being trapped in the vehicle by the seat belt, especially if it catches fire is a strong deterrent to use of seat belts.

A number of automatically separating seat belt fastening devices have been proposed. U.S. Pat. No. 4,014,080 (Caradec) discloses a fastener device in which tablets made of material which disintegrates when heated or submerged in a liquid, initiating movement of an element within the mechanism that releases the seat belt automatically, without necessity of the user to take any action to release the fasteners. The fastener housing is provided with a number of apertures through which water or hot air currents can pass to actuate the device under appropriate conditions. The device is thought to be impractical, and certainly is not easily integrable with a conventional seat belt fastener. U.S. Pat. No. 4,194,764 discloses a complex seat belt coupling device that senses certain stress conditions on the seat belt that might occur during an accident, and then actuates an electronic timer which then automatically releases or disconnects the seat belt after expiration of a predetermined amount of time. This device would be very expensive, and would have to be used in addition to a conventional low cost seat belt fastener.

U.S. Pat. No. 4,532,681 discloses a safety belt coupling device that releases when the temperature rises above a predetermined temperature that causes weakening of a heat-degradable adhesive, such as a solder having a low temperature melting point. U.S. Pat. No. 3,779,004 discloses another type of link including a transverse fusible temperature-responsive link retainer.

Some of the foregoing devices are not reusable after they have been actuated. This can be a disadvantage in hotter parts of the U.S., wherein the interior temperatures in the passenger compartment of an automobile in the summertime often exceed 170° Fahrenheit. Some of the prior devices might be actuated by such high temperatures and thereby be rendered unusable.

None of the above-described devices has the advantage that it can be easily and inexpensively used in conjunction with and/or incorporated into an ordinary conventional seat belt fastener.

Thus, there remains an unfulfilled need for a very low cost, highly reliable fastening device that can take the place of or be incorporated into a conventional seat belt fastener and give users the security of knowing that the device will automatically release if subjected to high temperatures, such as might be caused by the occurrence of a fire in the vehicle.

SUMMARY OF THE INVENTION

Accordingly, it is an object of the invention to provide a thermally actuated seat belt fastener that is simple in construction, reliable in operation, and is reusable even if actuated by high temperatures that may occur within a closed passenger compartment on a very hot day.

It is another object of the invention to provide a simple, low cost, thermally actuated seat belt fastener that will be readily and rapidly exposed to high temperatures that might occur in a passenger compartment of a vehicle as a result of fire.

It is another object of the invention to provide a thermally actuated seat belt fastening device which can be easily incorporated into a conventional seat belt fastening mechanism.

Briefly described, and in accordance with one embodiment thereof, the invention provides a thermally actuated seat belt fastener including an automative-type thermostatic element embodied in a protruding release button of a conventional seat belt fastener. If the protruding release button is heated, the thermostat element causes a plunger to be forced downward against an internal latch element, just as if the release button were being manually depressed. The two separable sections of the seat belt fastener mechanism then are separated by slight tension of the seat belt, allowing a person in the vehicle to remove himself or be removed without any attention whatsoever to the seat belt fastener.

DESCRIPTION OF THE INVENTION

Figure 1:
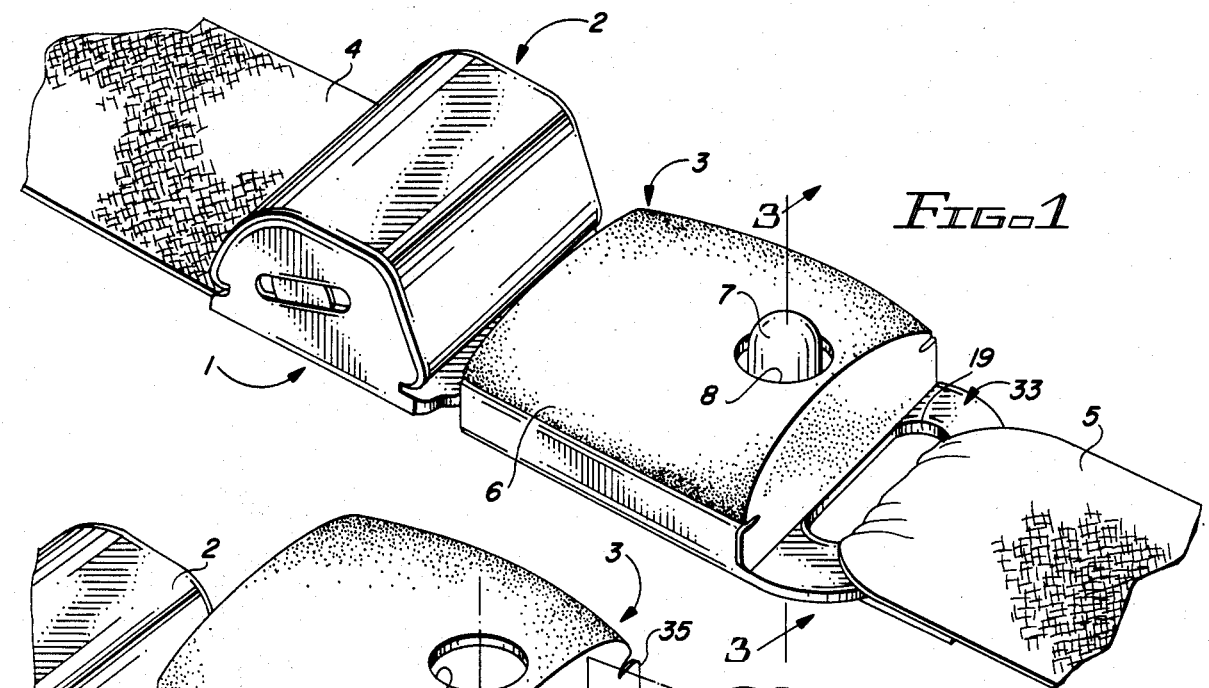
FIG. 1 is a perspective view illustrating the thermally actuated seat belt fastener of the present invention.
Figure 2:
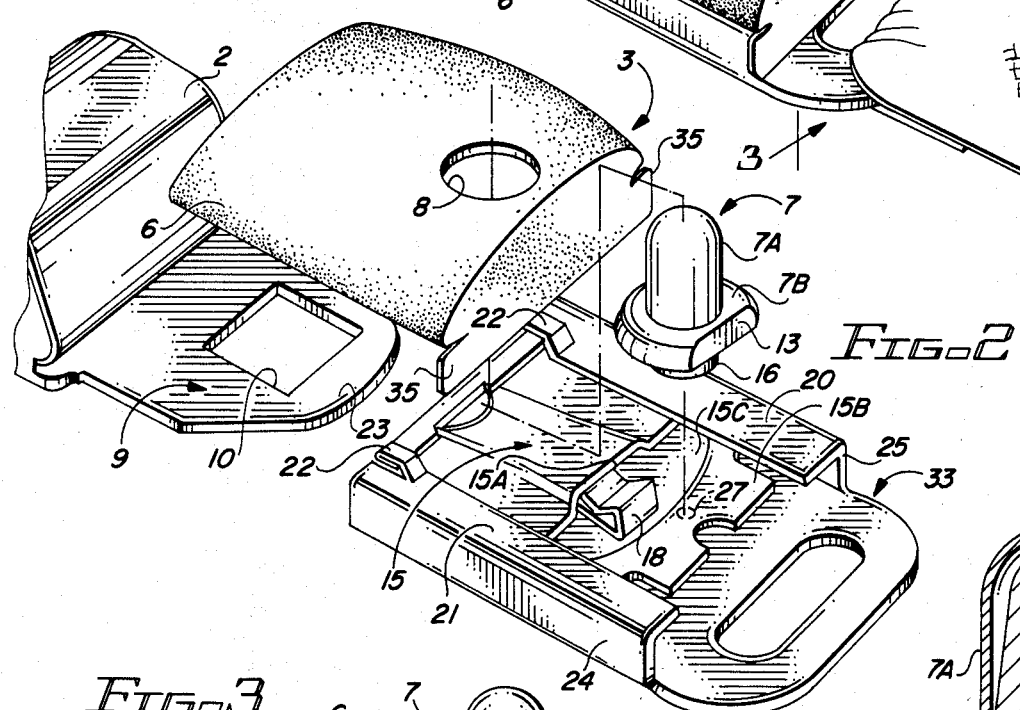
FIG. 2 is an exploded view of the fastener of FIG. 1.

Referring now to the drawings, fastener 1 includes a tongue section 2 adjustably connected to one section of a seat belt 4. Tongue section 2 includes a flat tongue plate 9 having a square hole 10 therein. A bar 23 of tongue section 9 retains tongue member 10 locked within a latch section 3 when the seat belt is fastened.

Latch section 3 includes a housing 6 clipped onto a base 33. Base 33 includes a right hand loop portion having an opening 19 therein through which an end of section 5 of the seat belt passes to make a loop connection.

Figure 3:
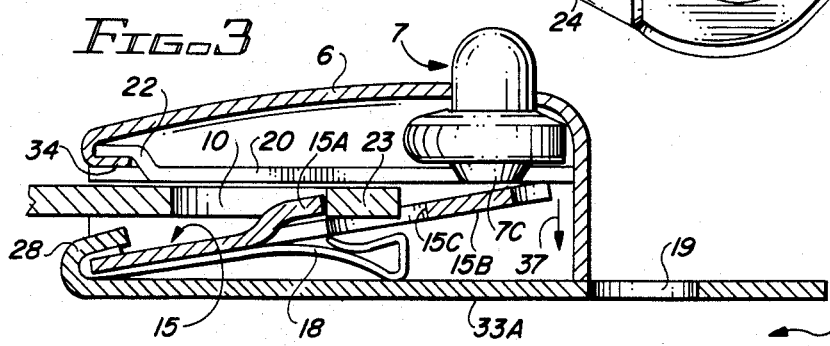
FIG. 3 is a section view taken along section line 3—3 of FIG. 1.

Base 33 includes two side walls 24 and 25 having inward flanges 21 and 20, respectively. Base 33 has a flat bottom plate 33A from which sides 24 and 25 extend and in which opening 19 is formed. Bottom plate 33A has a retaining flange 28 at its left end, as shown in FIG. 3 to retain the left end of a movable latch plate 15.

Latch plate 15 includes a lower left end inserted loosely into a groove formed by flange 28 and the left end of bottom plate 33A. The raised ridge 15A of latch plate 15 extends into opening 10 of tongue plate 9 and abuts the inner edge of bar 23 when the seat belt is fastened, as shown in FIG. 3. A clip spring 18 has a left-hand section clipped onto the left end of latch plate 15, as shown in FIG. 3, and urges latch plate 15 upward against the bottom surfaces of flanges 20 and 21. An opening 15C in latch plate 15 accommodates bar 23 of tongue plate 9. A bar 15B of latch plate 15 forms the right-hand end of latch plate 15.

Housing 6 includes an open bottom and a left end flange 34 which extends under raised clip portions 22 of the left ends of flanges 20 and 21. The right end of housing 6 has two tabs 35 which snap into place under the right-hand ends of flanges 20 and 21 to lock the housing 6 in place, as shown in FIG. 1. The housing can be easily pried off with a screwdriver.

A circular opening 8 in the top of the right-hand end portion of housing 6 is provided. A release button 7 extends through opening 10. The release button 7 includes an upper portion 7A that extends through opening 8 in housing 6 and a flange 7B that retains release button 7 within the housing. A flat 13 on flange 7B allows placement of opening 8 close to the right end plate of housing 6. Depressing of release button 7 causes the bottom surface 7C to press against the contact spot 27 of right end bar 15B of latch plate 15, pressing it downward as indicated by arrow 37 in FIG. 3. This causes ridge 15A to be depressed below right end bar 23 of tongue plate 9, allowing tongue plate 9 to be withdrawn from latch section 3 during normal operation of the seat belt fastener 1.

Figure 4:
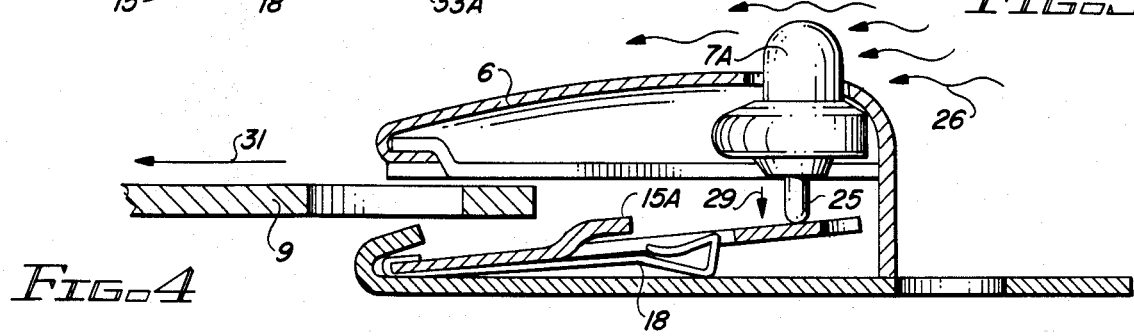
FIG. 4 is a section view similar to FIG. 3 illustrating automatic thermal actuation of the fastener.

As best seen in FIGS. 3 and 4, the side portions of tongue plate 9 slide under flanges 20 and 21, when tongue plate 9 is inserted into the open left end of latch section 3. The leading edge of bar 23 strikes the sloped surface of ridge 15A, depressing latch plate 15 until ridge 15A is aligned with opening 10, at which point latch plate 15 snaps back upward, the right-hand edge of ridge 15A abutting the inner surface of bar 23 of tongue plate 9, preventing withdrawal of tongue plate 9.

Figure 5:
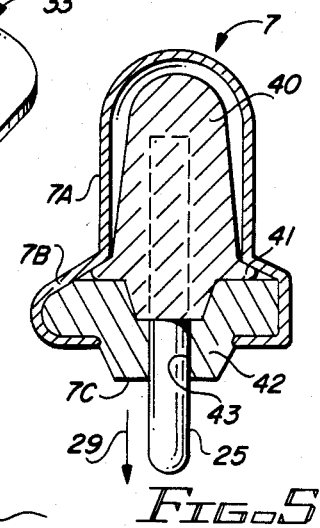
FIG. 5 is a section view of the automotive-type thermostatic element used in the invention.

In accordance with the present invention, the release button 7 contains a temperature-sensitive thermostat element, which in the present embodiment of the invention is similar to or identical to the elements contained in automative engine cooling system thermostats. For the prototype units constructed to date, a thermostat element of the type manufactured in 160 degree automotive thermostats by Procon Automotive, of 1645 Begin Street, St. Lourent, Montreal, Canada were obtained. The lower flange 7B and 7C thereof was modified by grinding to the shape shown in the drawings. The device includes a movable plunger 25 which at temperatures below 160° Fahrenheit is completely recessed, but extends outward approximately one-eighth of an inch or so when the temperature exceeds 160°, as shown in FIG. 5. In accordance with the present invention, when air warmer than about 160° raises the temperature of upper section 7A, plunger 25 moves downward, as indicated by arrow 29 in FIG. 4, automatically depressing latch plate 15 just as if the release button 7 had been manually depressed. This automatically releases latch section 3 from tongue section 2. A slight amount of tension on the seat belt then causes the tongue plate 9 to be withdrawn, allowing an injured passenger to be removed or move under his own power from a passenger compartment in which the temperature is rapidly rising as a result of a fire, with no attention being required to be focused on releasing the seat belt.

The device described above can be readily used in automobiles, boats and in aircraft seat belts. The described devices has a major advantage over the prior art in that the thermostatic portion is contained within the protruding portion 7A of the release button, and will be immediately exposed to high temperature conditions occurring in the passenger compartment of a vehicle, with no time delay being required for the heat to pass through suitable apertures in the housings, as in some prior devices, thereby saving precious seconds in which an injured person can remove himself from the compartment of a burning vehicle.

It is known that the human body can withstand relatively high air temperatures, such as 160°–180°, for a few minutes without experiencing either severe burns, or lung damage. For example, in hot climates, it is quite common for people to get inside a car that has been parked in the sun, in which the interior temperatures are about 180° Fahrenheit, without unacceptably high discomfort, as long as the temperature is lowered fairly quickly either by air conditioning or by opening the vehicle's windows. If the above-described fastener is actuated by such high temperatures, the plunger 25 simply recedes under pressure from spring 18 when the temperature falls, and will be actuated when used again if high passenger compartment temperatures occur.

In accordance with another aspect of the present invention, thermostatic devices such as in FIG. 5 are utilized to control removable pins that connect other portions of the seat belt to the rigid body structure. For example, a thermostatic device such as 7 can be positioned close to the gas tank of a vehicle and connected by a cable to release pins in the passenger compartment connecting ends of the seat belt to anchor points, disconnecting the ends of the seat belts from their anchors if high temperature conditions are sensed in the gas tank portion of the automobile as a result of the outbreak of a fire near the fuel tank section of the automobile.

Another major advantage of the above-described device is that it can be added at very low cost to proven seat belt fasteners, and without their modifying normal operation. All that needs to be done to modify present seat belt fastener designs is to replace the conventional release buttons with the thermostatic release buttons described above.

FIG. 5 shows a section view of the thermostatic device, in which a rubbery blended wax material 40 has a lower flange pinched between the outer housing 7A and an insert 42 having a hole 43 through which plunger 25 slideably extends. The upper end of plunger 25 is embedded in the rubbery blended wax material. The blend of the wax material determines the temperature at which the material shrinks and drives plunger 25 downward in the direction of arrow 29.

While the invention has been described with reference to a particular embodiment thereof, those skilled in the art will be able to make various modifications to the described embodiment of the invention without departing from the true spirit and scope of the invention. For example, it is intended that all devices and methods which perform substantially the same function in substantially the same way to achieve the same result as the described embodiment of the invention are considered to be within the scope of the invention.

We claim:
1. A seat belt fastener comprising in combination:
 (a) a tongue member including a transverse retaining edge;

(b) a latch mechanism including a movable retaining member for engaging the transverse retaining edge to prevent removal of the tongue member from the latch mechanism;

(c) release button means in the latch mechanism for moving the movable retaining member away from the transverse retaining edge as the release button means is depressed by a user to release the seat belt fastener; and (d) temperature-sensitive means within the release button means for forcing a thrust member from the release button means against the movable retaining member to move it away from the transverse retaining edge if the temperature of the release button means exceeds a predetermined level, thereby automatically releasing the seat belt fastener without depressing of the release button means if the temperature of the release button means exceeds the predetermined level.

2. The seat belt fastener of claim 1 wherein the temperature-sensitive means includes a rubbery blended wax material engaging the thrust member and forcing the thrust member to move out of the release button means when the temperature of the release button means exceeds the predetermined temperature.

3. The seat belt fastener of claim 2 wherein the release button means includes an automotive engine coolant thermostat type of element.

4. The seat belt fastener of claim 3 including a housing having an opening through which a portion of the release button means extends a predetermined distance to improve transfer of heat in a passenger compartment to the temperature-sensitive means in order to rapidly automatically release the seat belt fastener upon the occurrence of a high temperature condition in the passenger compartment.

5. A seat belt fastener comprising in combination:
(a) a tongue member including a transverse retaining edge;
(b) a latch mechanism including a movable retaining member for engaging the transverse retaining edge to prevent removal of the tongue member from the latch mechanism;
(c) release button means in the latch mechanism for moving the movable retaining member away from the transverse retaining edge as the release button means is depressed by a user to release the seat belt fastener; and
(d) temperature-sensitive means for forcing a thrust member from the release button means against the movable retaining member to move it away from the transverse retaining edge if the temperature of the release button means exceeds a predetermined level, thereby automatically releasing the seat belt fastener without depressing of the release button means if the temperature of the release button means exceeds the predetermined level.

* * * * *